(12) United States Patent
Braam

(10) Patent No.: US 7,996,473 B2
(45) Date of Patent: Aug. 9, 2011

(54) PROFILE-BASED CONVERSION AND DELIVERY OF ELECTRONIC MESSAGES

(75) Inventor: Carl A. Braam, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 266 days.

(21) Appl. No.: 11/830,407

(22) Filed: Jul. 30, 2007

(65) Prior Publication Data
US 2009/0037536 A1 Feb. 5, 2009

(51) Int. Cl.
*G06F 15/16* (2006.01)
(52) U.S. Cl. .................. 709/206; 709/218; 709/219
(58) Field of Classification Search .............. 709/206, 709/218, 219
See application file for complete search history.

(56) References Cited

U.S. PATENT DOCUMENTS

| | | | |
|---|---|---|---|
| 6,430,604 B1 | 8/2002 | Ogle et al. | 709/207 |
| 6,654,448 B1 * | 11/2003 | Agraharam et al. | 379/88.14 |
| 6,697,474 B1 * | 2/2004 | Hanson et al. | 379/201.01 |
| 6,707,890 B1 | 3/2004 | Gao et al. | 379/88.12 |
| 6,807,565 B1 | 10/2004 | Dodrill et al. | 709/206 |
| 6,816,578 B1 | 11/2004 | Kredo et al. | 379/88.17 |
| 7,065,186 B1 | 6/2006 | Myers et al. | 379/88.17 |
| 7,085,258 B2 | 8/2006 | Creamer et al. | 370/352 |
| 7,317,788 B2 * | 1/2008 | Caspi et al. | 379/88.13 |
| 2004/0151284 A1 * | 8/2004 | Adamczyk | 379/88.13 |
| 2005/0013426 A1 * | 1/2005 | Ooki | 379/211.02 |
| 2005/0136896 A1 * | 6/2005 | Ward et al. | 455/413 |
| 2005/0163289 A1 * | 7/2005 | Caspi et al. | 379/88.13 |
| 2008/0148320 A1 * | 6/2008 | Howcroft | 725/61 |
| 2008/0155018 A1 * | 6/2008 | Fortier et al. | 709/204 |
| 2008/0155030 A1 * | 6/2008 | Fortier et al. | 709/206 |
| 2008/0162132 A1 * | 7/2008 | Doulton | 704/235 |
| 2008/0235024 A1 * | 9/2008 | Goldberg et al. | 704/260 |
| 2009/0083032 A1 * | 3/2009 | Jablokov et al. | 704/235 |
| 2009/0147937 A1 * | 6/2009 | Sullhan et al. | 379/201.02 |
| 2009/0157830 A1 * | 6/2009 | Kim | 709/206 |

FOREIGN PATENT DOCUMENTS

EP 1411736 A1 * 4/2004

OTHER PUBLICATIONS

F. Baessler et al., "Text Message Conversion System e.g. For Short Message System Message in Telecommunication System, uses Interpreted Tags in Text Messages, as Parameters for Text-to-Speech Conversion" 2004.

* cited by examiner

*Primary Examiner* — Mohamed Wasel
(74) *Attorney, Agent, or Firm* — Hamilton & Terrile, LLP; Gary W. Hamilton

(57) ABSTRACT

A method, system and computer usable medium are disclosed for delivering an electronic message. A first computer is used to receive voice data from a user and to generate a message data file therefrom. A test is then conducted to determine whether a predetermined second computer is operably coupled to the communication network. If the result of the test indicates that the second computer is not coupled to the communication network, the message data file is forwarded to a predetermined storage location in an electronic messaging system. The message data file is subsequently retrieved from the predetermined storage location by the predetermined second computer and processed to comprise text data or voice mail data prior to forwarding to the predetermined storage location in the electronic messaging system.

20 Claims, 7 Drawing Sheets

PROFILE-BASED CONVERSION AND DELIVERY OF ELECTRONIC MESSAGES

BACKGROUND OF THE INVENTION

1. Field of the Invention

Embodiments of the disclosure relate in general to the field of computers and similar technologies and, in particular, to software utilized in this field. More specifically, it relates to the transmission of electronic messages using an instant messaging system.

2. Description of the Related Art

An instant messaging system (IMS) provides a simple way to exchange real-time, text-based messages between users who are connected to on-line or electronic networking environments such as the Internet, intranets, and extranets. These systems, which have gained popularity due to their simplicity and ease of use, require both sender and recipient to be simultaneously logged-on to exchange messages. Users that are logged-on are typically indicated through visual cues, such as icons or text attributes (e.g., font, color, bold face, etc.). By ensuring that the recipient is available when a message is sent, the message can be delivered and presented to the recipient nearly instantaneously.

To send an IMS message, a user generally logs on with an IMS client, selects one or more recipients from an address book of other IMS users that are currently on-line, and then composes and sends a message. However, there are situations where the requirement for IMS message recipients to be concurrently logged-on becomes problematic, such as when a message recipient's on-line status changes during an IMS session. For example, a sender may be typing a message to a recipient only to discover that the recipient has gone off-line, resulting in the message being rejected by the IMS.

There are cases when the sender's message is not time-critical and it would be preferable to provide an alternative message delivery method instead of simply discarding the sender's message. For example, it may be possible to reach a recipient email, text pager, or voicemail when they when they cannot be reached by an IMS. Current alternative IMS message delivery methods include conversion of IMS messages to alternative text formats for delivery to email or text pager systems. Other approaches include text-to-speech (TTS) conversion of IMS messages for delivery to a user's telephone or voicemail. However, there are times when these options are insufficient and it would be advantageous for an IMS user to be able to generate a voice message while remaining on-line and without being required to place a separate phone call.

BRIEF SUMMARY OF THE INVENTION

A method, system and computer usable medium are disclosed for delivering an electronic message. In various embodiments of the invention a first computer is used to receive voice data from a user and to generate a message data file therefrom. A test is then conducted to determine whether a predetermined second computer is operably coupled to the communication network. If the result of the test indicates that the second computer is not coupled to the communication network, the message data file is forwarded to a predetermined storage location in an electronic messaging system. In various embodiments of the invention, the message data file is subsequently retrieved from the predetermined storage location by the predetermined second computer.

In some embodiments of the invention, the message data file is processed to comprise text data prior to forwarding to the predetermined storage location in the electronic messaging system. In some embodiments, the text data in the message data file is displayed on a user interface device coupled to the first computer prior to being forwarded to the predetermined storage location in the electronic messaging system.

In other embodiments of the invention, the message data file is processed to comprise voicemail data prior to forwarding to the predetermined storage location in the electronic messaging system. In some embodiments, the voicemail data is formatted to comprise a voice over internet protocol (VoIP) format prior to forwarding to the predetermined storage location.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
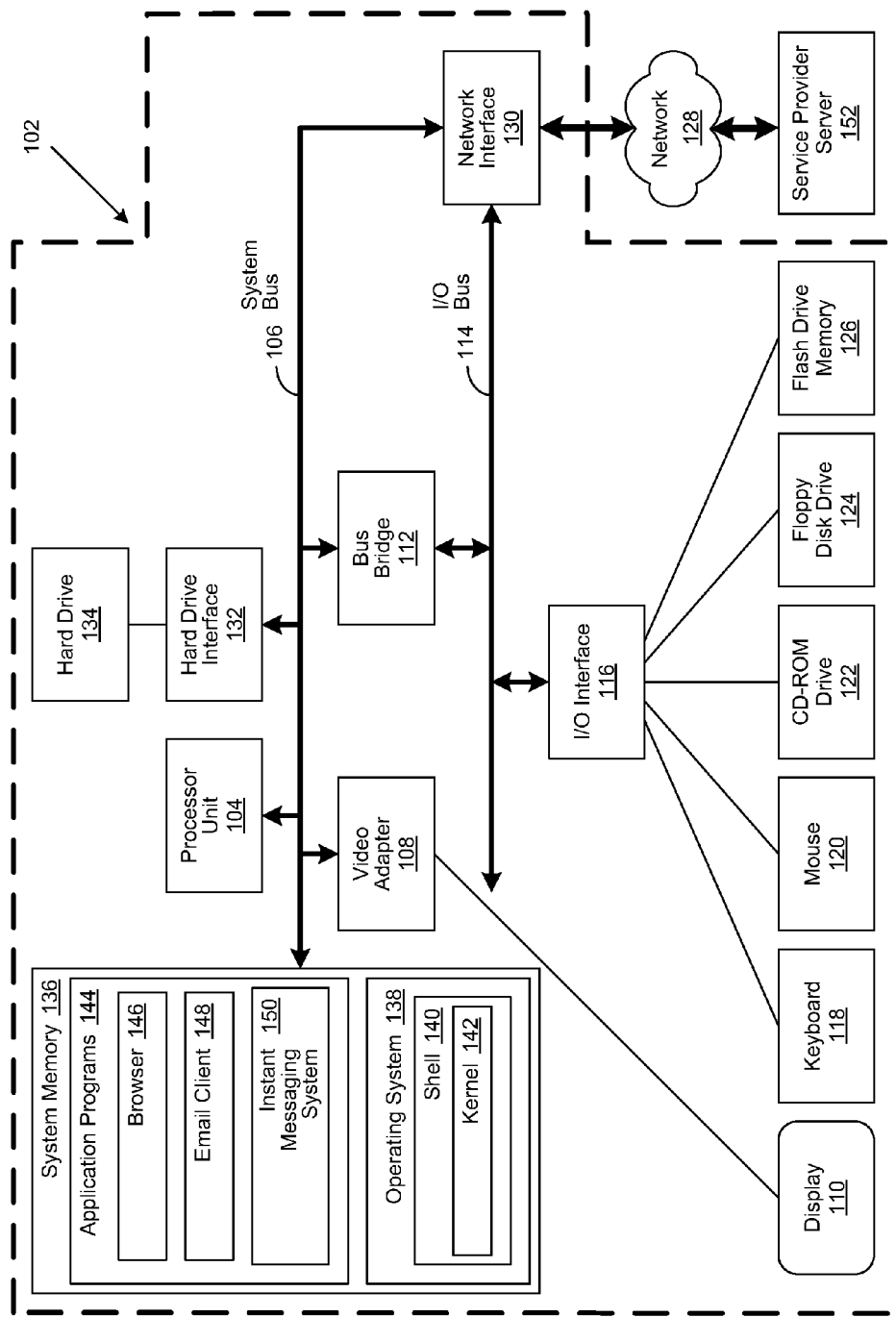
FIG. 1 depicts an exemplary client computer in which the present invention may be implemented.

A method, system and program are disclosed for delivering an electronic message in non-real-time to an alternative electronic messaging system (EMS). As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and application programs 144.

OS 138 includes a shell 140 for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and application programs 144, including memory management, process and task management, disk management, and mouse and keyboard management.

Application programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Application programs 144 also include an instant messaging client 150. Instant messaging client 150 includes code for implementing the processes described in FIGS. 2 through 5 described hereinbelow. In one embodiment, client computer 102 is able to download instant messaging client 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
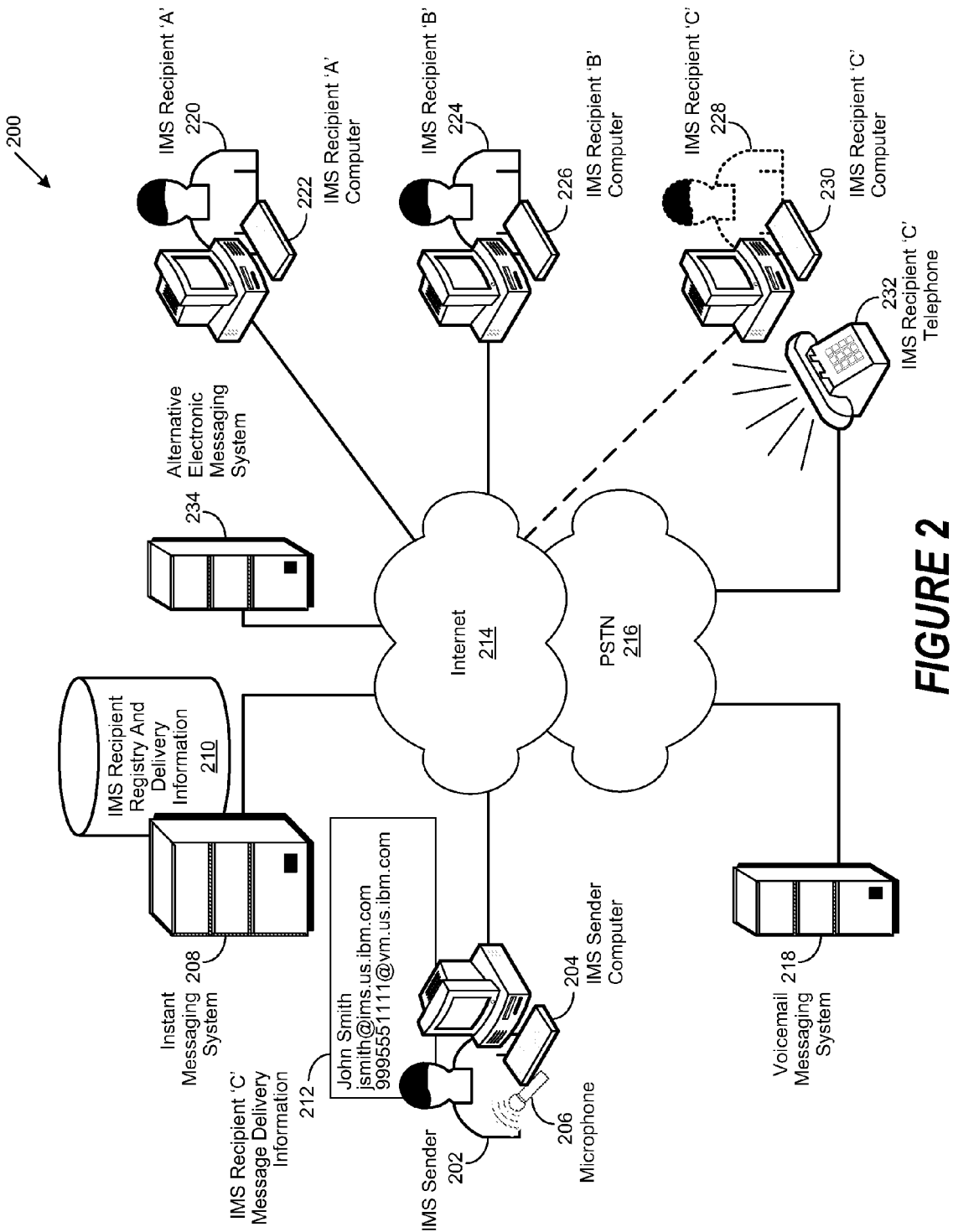
FIG. 2 is a simplified block diagram of an instant messaging system (IMS) as implemented in accordance with an embodiment of the invention.

FIG. 2 is a simplified block diagram of an instant messaging system (IMS) 200 as implemented in accordance with embodiments of the invention. In various embodiments, an instant messaging system (IMS) session is begun with an IMS message sender 202 accessing IMS system 208, which comprises an IMS recipient registry 210. In one embodiment, the IMS recipient registry 210 indicates that IMS message recipients 'A' 220 and 'B' 224 are currently on-line, while IMS message recipient 'C' 228 is not. In these embodiments, IMS recipient registry 210 also comprises message delivery information, including delivery information 212 used for non-realtime delivery of IMS messages to off-line IMS message recipient 'C' 228. In one embodiment, the message delivery information comprises voicemail address, format and communication protocol information. In another embodiment, the message delivery information comprises electronic mail (email) address, format and communication protocol information.

The IMS message sender 202 begins an IMS session by selecting on-line IMS message recipients 'A' 220 and 'B' 224, and off-line recipient 'C' 228 from the IMS recipient registry. During the IMS session, IMS message sender 202 enters text into a user interface window of an IMS client application (not shown) running on IMS sender computer 204. The entered text is received by the IMS 208, which references the IMS recipient registry 210 to determine the intended IMS message recipient 'A' 220, 'B' 224 or 'C' 228. Using the message delivery information contained in the IMS recipient registry 210, the IMS 208 uses the Internet 214 to deliver the text entered by IMS sender 202 as a real-time text message to the intended on-line IMS message recipient's computer 'A' 222 or 'B' 226. Since IMS message recipient 'C' 228 is indicated to be off-line by the IMS recipient registry 210, the IMS sender 202 is given the option of delivering an IMS message using an alternative or non-real-time IMS message delivery method.

In one embodiment, the IMS message sender 202 records a voice message by speaking into a microphone 206 coupled to an IMS client application (not shown) running on IMS sender computer 204. In this embodiment, the IMS message sender 202 records, pauses, replays, edits, cancels and performs other voice message operations through user gestures with the user interface of the IMS client application. Through implementation of these voice message operations, the IMS sender 202 can review an audio version of the voice message prior to its non-real-time delivery to IMS message recipient 'C' 228. In one embodiment, speech-to-text conversion operations familiar to those of skill in the art are performed, and the converted text is displayed within a window of the IMS client application. Once displayed, the IMS message sender 202 can review the converted text of the voice message and make desired revisions prior to the non-real-time delivery of the voice message to the off-line IMS message recipient 'C' 228. After the voice message is reviewed and any desired revisions are completed, the IMS message sender uses the message delivery information of IMS recipient 'C' 212 to select routing of the voice message to voicemail messaging system 218. The IMS 208 uses the message delivery information to route the voice message through the Internet 214, and in turn through the public switched telephone network (PSTN) 216, to the voice mail messaging system 218. The voicemail messaging system 218 receives the voice message and stores it as a voicemail in a voice mailbox assigned to IMS recipient 'C' 228. In one embodiment, the voicemail messaging system 218 uses one or more methods familiar to those of skill in the art to notify the IMS recipient 'C' 228 that a voicemail has been received. The IMS recipient 'C' 228 then uses telephone 232 to accesses the voicemail messaging system 218 and retrieve the voice message from their voice mailbox.

In another embodiment the IMS message sender 202 composes a text message within the IMS client application for conversion into a synthesized voice message that will be delivered to the voicemail messaging system 218 in non-real-time. In this embodiment, the IMS message recipient 'C' 228 is either off-line, real-time delivery of the message is not necessary, or the IMS message sender 202 may prefer that the IMS text message be delivered as a voice message. Accordingly, the IMS message sender 202 composes, reviews, and edits the text message within a window of the IMS client application running on the IMS sender computer 210. Once the IMS message sender 202 completes composition of the IMS text message, text-to-speech conversion operations familiar to those of skill in the art are performed by the IMS 208. The IMS 208 then uses associated message delivery information to deliver the converted IMS text message in non-real-time as a voice message to the voice mail messaging system 218. The voicemail messaging system 218 receives the voice message and stores it as a voicemail in a voice mailbox assigned to IMS recipient 'C' 228. The IMS recipient 'C' 228 then uses telephone 232 to accesses the voicemail messaging system 218 and retrieve the voice message from their voice mailbox.

In yet another embodiment, the IMS message sender 202 composes a text message within the IMS client application for delivery to the alternative electronic messaging system 234 (e.g., an email system) in non-real-time. In this embodiment, the IMS message recipient 'C' 228 is either off-line, real-time delivery of the message is not necessary, or the IMS message sender 202 may prefer that the IMS text message be delivered through the alternative electronic messaging system 234. Accordingly, the IMS message sender 202 composes, reviews, and edits the text message within a window of the IMS client application running on the IMS sender computer 210. Once the IMS message sender 202 completes composition of the IMS text message, text-to-text conversion operations familiar to those of skill in the art are performed by the IMS 208. The IMS 208 then uses associated message delivery information to deliver the converted IMS text message in non-real-time to the alternative electronic messaging system 234. The alternative electronic messaging system 234 receives the converted text message and stores it as a native text message in a text message mailbox assigned to IMS recipient 'C' 228. The IMS recipient 'C' computer 234 is then used by IMS recipient 'C' to access the alternative electronic messaging system 234 and retrieve the text message from their text message mailbox.

Figure 3:
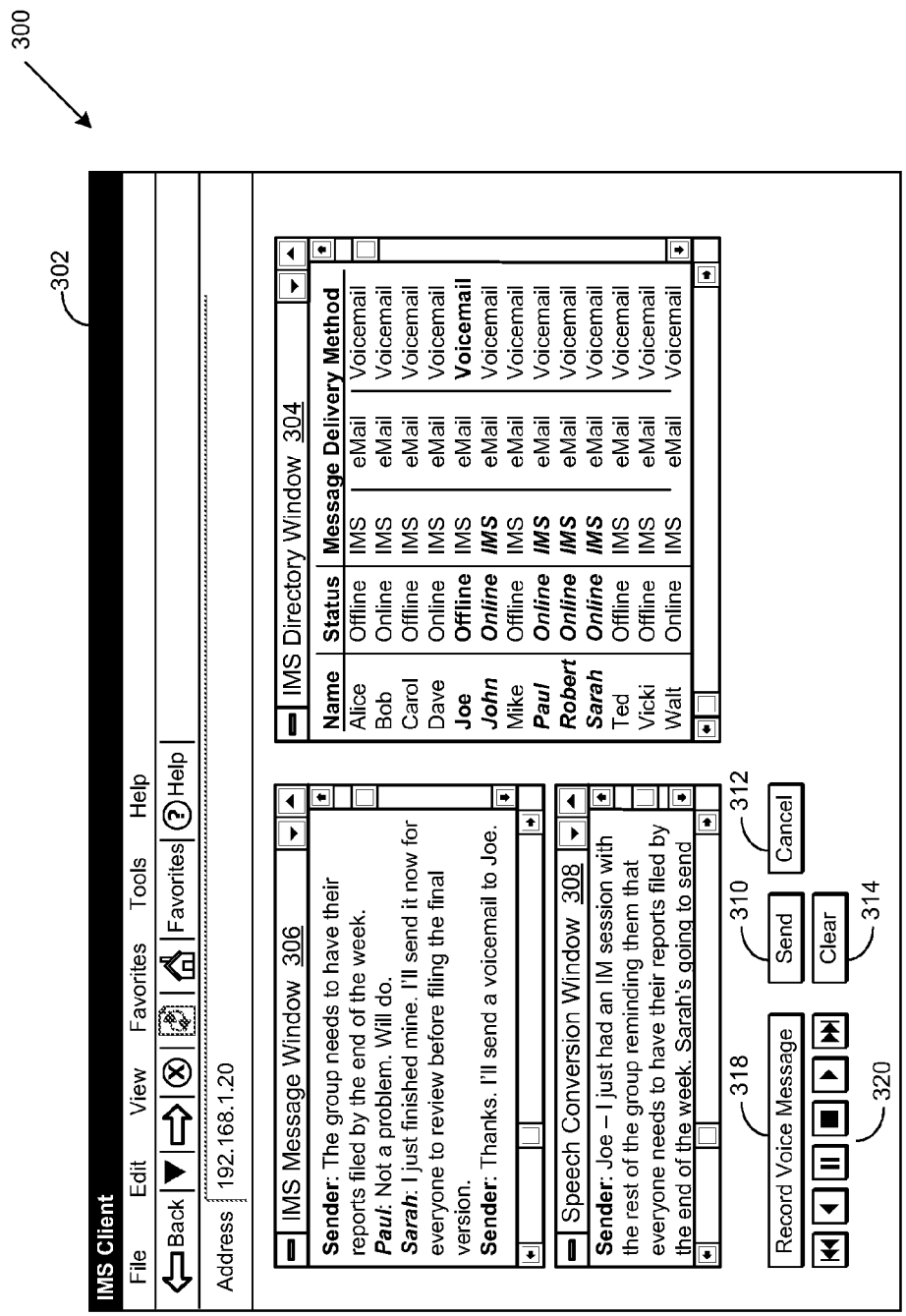
FIG. 3 is a generalized illustration of an IMS user interface as implemented in accordance with an embodiment of the invention.

FIG. 3 is a generalized illustration of an instant messaging system (IMS) user interface 300 as implemented in accordance with an embodiment of the invention.

In various embodiments, an IMS client is implemented to present an IMS user interface (UI) 302 to the users of an IMS. In these embodiments, the IMS UI 302 comprises IMS directory window 304, IMS message window 306, and speech conversion window 308. The IMS UI 302 further comprises IMS user controls for IMS message operations, including "send" 310, "cancel" 312, "clear" 314, along with "record voice message" button 318 and "voice message recording control icons" 320, which are used for recording voice messages.

An IMS message sender initiates an instant messaging system (IMS) session by accessing an IMS system through the IMS UI 302. After connecting to the IMS, the contents of an IMS recipient registry are displayed in IMS directory window 304, including IMS recipients and their IMS connection status. In various embodiments, additional IMS recipient registry content is displayed in IMS directory window 304, including message delivery information used for non-real-time delivery of IMS messages to off-line IMS message recipients. In one embodiment, the message delivery information comprises voicemail address, format and communication protocol information. In another embodiment, the message delivery information comprises electronic mail (email) address, format and communication protocol information.

Once the IMS session is initiated, the IMS message sender selects on-line and off-line IMS message recipients within the IMS directory window 304 through a user gesture such as a mouse click. In one embodiment, text attributes such as a bold, italic, or color are applied to IMS recipient entries within the IMS UI 304 to indicate which recipients have been selected by the IMS message sender to receive an IMS message. In another embodiment, similar attributes are applied to IMS recipient entries to designate alternative or non-real-time IMS message delivery methods.

As an example, "Joe", "John", "Paul", "Robert" and "Sarah" are indicated to be selected for receipt of IMS messages by the application of a bold text attribute to their IMS recipient "name" and "status" entries within the IMS UI 304. However, "John," "Paul," "Robert" and "Sarah" are currently on-line, with the result that an italic text attribute is additionally applied to their recipient "name" and "status" entries. Conversely, "Joe" is off-line, result that an italic text attribute is not additionally applied to his recipient "name" and "status" entry. In this example, the same text attributes are similarly applied to their respective recipient entries for a default "message delivery method." Since "John," "Paul," "Robert" and "Sarah" are currently on-line, their default message delivery method is designated as "IMS," whereas "Joe," who is currently off-line, is designated to receive IMS messages via "voicemail."

During the IMS session, the IMS message sender enters text into the IMS message window 306 of IMS UI 304 and uses user controls 310, 312 and 314 to control the sending of IMS text messages. The entered text is received by the IMS, which references the IMS recipient registry to determine the intended IMS message recipient. Using the message delivery information contained in the IMS recipient registry, the IMS delivers the entered text as a real-time text message to the intended on-line IMS message recipient. If an intended IMS message recipient is off-line, the IMS sender is given the option of delivering an IMS message using an alternative or non-real-time IMS message delivery method.

In one embodiment, the IMS message sender records a voice message by speaking into a microphone coupled to their IMS client application. In this embodiment, the IMS message sender records a voice message by using the "record voice message" button 318 and "voice message recording control icons" 320 to perform record, pause, replay, edit, cancel and other voice message operations. Implementation of these voice message operations allows the IMS sender to review an audio version of the voice message prior to its non-real-time delivery to on off-line IMS message recipient. In one embodiment, speech-to-text conversion operations familiar to those of skill in the art are performed, and the converted text is displayed within speech conversion window 308. Once displayed, the IMS message sender can review the converted text of the voice message and make desired revisions prior to the non-real-time delivery of the voice message to the off-line IMS message recipient. After the voice message is reviewed and any desired revisions are completed, the IMS message sender selects "voicemail" through a user gesture within IMS directory window 304 as the desired "message delivery method" for the off-line recipient. The IMS then uses the associated message delivery information stored within the IMS recipient registry to route the voice message to the corresponding voice mail messaging system. In turn, the voicemail messaging system receives the voice message and stores it as a voicemail in a voice mailbox assigned to the selected off-line IMS message recipient. The off-line IMS message recipient then accesses the voicemail messaging system and retrieves the voice message from their voice mailbox.

In another embodiment, the IMS message sender composes a text message within the IMS message window 306 for conversion into a synthesized voice message that will be delivered to a voicemail messaging system in non-real-time. In this embodiment, the IMS message recipient is either off-line, real-time delivery of the message is not necessary, or the IMS message sender may prefer that the IMS text message be delivered as a voice message. Accordingly, the IMS message sender composes, reviews, and edits the text message within the IMS message window 306. Once the IMS message sender completes composition of the IMS text message, text-to-speech conversion operations familiar to those of skill in the art are performed by the IMS. The IMS then uses associated message delivery information stored within the IMS recipient registry to deliver the converted IMS text message in non-real-time as a voice message to the IMS message recipient's voice mail messaging system. In turn, the voicemail messaging system receives the voice message and stores it as a voicemail in a voice mailbox assigned to the selected off-line IMS message recipient. The off-line IMS message recipient then accesses the voicemail messaging system and retrieves the voice message from their voice mailbox.

In yet another embodiment, the IMS message sender composes a text message within the IMS message window 306 for conversion into a text message that will be delivered to an alternative electronic messaging system (e.g., an email system) in non-real-time. In this embodiment, the IMS message recipient is either off-line, real-time delivery of the message is not necessary, or the IMS message sender may prefer that the IMS text message be delivered through the alternative electronic messaging system. Accordingly, the IMS message sender composes, reviews, and edits the text message within the IMS message window 306. Once the IMS message sender completes composition of the IMS text message, text-to-text conversion operations familiar to those of skill in the art are performed by the IMS. The IMS then uses associated message delivery information stored within the IMS recipient registry to deliver the converted IMS text message in non-real-time to the alternative electronic messaging system. The alternative electronic messaging system receives the converted text message and stores it as a native text message in a text message mailbox assigned to the IMS message recipient. The IMS recipient then accesses the alternative electronic messaging system and retrieves the text message from their text message mailbox.

Figure 4:
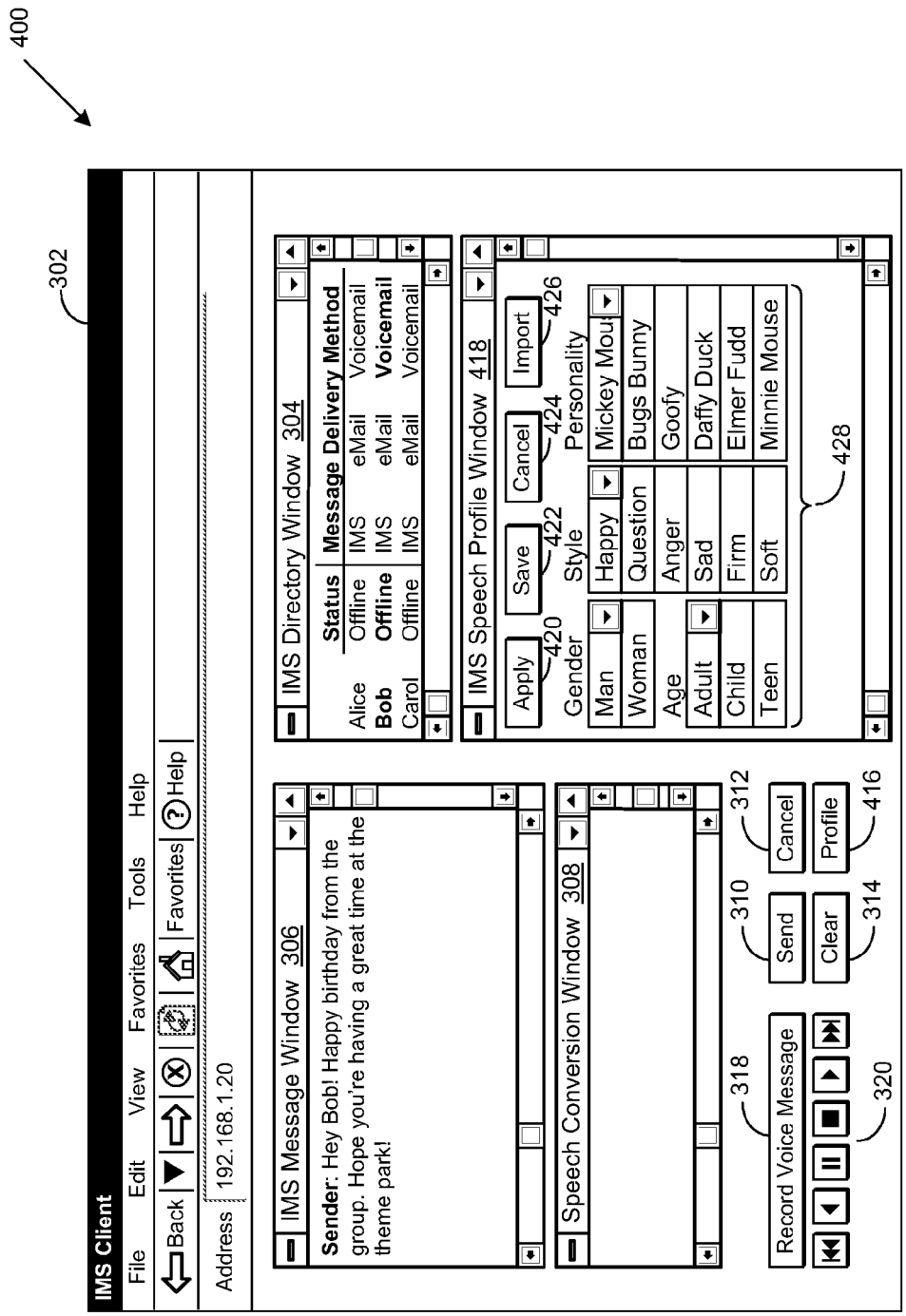
FIG. 4 is a generalized illustration of an IMS user interface as implemented with user-selectable voice profile attributes in accordance with an embodiment of the invention.

FIG. 4 is a generalized illustration of an instant messaging system (IMS) user interface 400 as implemented with user-selectable voice profile attributes in accordance with an embodiment of the invention. In various embodiments, an IMS client is implemented to present an IMS user interface (UI) 302 to the users of an IMS. In these embodiments, the IMS UI 302 comprises IMS directory window 304, IMS message window 306, speech conversion window 308, and IMS speech profile window 418. The IMS UI 302 further comprises IMS user controls for IMS message operations, including "send" 310, "cancel" 312, "clear" 314, "apply profile" 416, along with "record voice message" button 318 and "voice message recording control icons" 320, which are used for recording voice messages. IMS speech profile window 418 further comprises speech profile control buttons "apply" 420, "save" 422, "cancel" 424, "import" 428, and speech profile attributes 428.

An IMS message sender initiates an instant messaging system (IMS) session by accessing an IMS system through the IMS UI 302. After connecting to the IMS, the contents of an IMS recipient registry are displayed in IMS directory window 304, including IMS recipients and their IMS connection status. Once the IMS session is initiated, the IMS message sender selects on-line and off-line IMS message recipients within the IMS directory window 304 through a user gesture such as a mouse click. In one embodiment, text attributes such as a bold, italic, or color are applied to IMS recipient entries within the IMS UI 304 to indicate which recipients have been selected by the IMS message sender to receive an IMS message. In another embodiment, similar attributes are applied to IMS recipient entries to designate alternative or non-real-time IMS message delivery methods.

During the IMS session, the IMS message sender enters text into the IMS message window 306 of IMS UI 304 and uses user controls 310, 312 and 314 to control the sending of IMS text messages. The entered text is received by the IMS, which references the IMS recipient registry to determine the intended IMS message recipient. Using the message delivery information contained in the IMS recipient registry, the IMS delivers the entered text as a real-time text message to the intended on-line IMS message recipient. If an intended IMS message recipient is off-line, the IMS sender is given the option of delivering an IMS message using an alternative or non-real-time IMS message delivery method.

In another embodiment the IMS message sender composes a text message within the IMS message window 306 for conversion into a synthesized voice message that will be delivered to a voicemail messaging system in non-real-time. In this embodiment, the IMS message recipient is either off-line, real-time delivery of the message is not necessary, or the IMS message sender may prefer that the IMS text message be delivered as a voice message. Accordingly, the IMS message sender composes, reviews, and edits the text message within the IMS message window 306 and then selects voice profile attributes within the IMS speech profile window 418.

In one embodiment, the IMS message sender selects gender (e.g., male, female), age (child, teen, adult, etc.), and style (question, happy, sad, etc.) speech profile attributes 428 which are applied to the IMS text during to its conversion to a voice message. In another embodiment, personality voices (e.g., cartoon characters, movie stars, etc.) are likewise applied to the IMS text. The application of these voice profile attributes allows the IMS message sender to create a synthesized voice message tone and style for the voice message that will be delivered in non-real-time to the IMS message recipient. Many such voice profile attribute combinations are possible and the foregoing examples are neither exhaustive nor intended to constrain the possible combinations that are implementable in different embodiments of the invention. In another embodiment, voice profile attributes are imported for use by the IMS system.

The selected voice profile attributes are then applied to the IMS message text during text-to-speech conversion operations familiar to those of skill. Text-to-speech conversion operations are then performed by the IMS to generate a synthesized voice message with the desired speech profile attributes. The IMS then uses associated message delivery information stored within the IMS recipient registry to deliver the converted IMS text message in non-real-time as a voice message to the IMS message recipient's voice mail messaging system. In turn, the voicemail messaging system receives the voice message and stores it as a voicemail in a voice mailbox assigned to the selected off-line IMS message recipient. The off-line IMS message recipient then accesses the voicemail messaging system and retrieves the voice message from their voice mailbox.

Figure 5A:
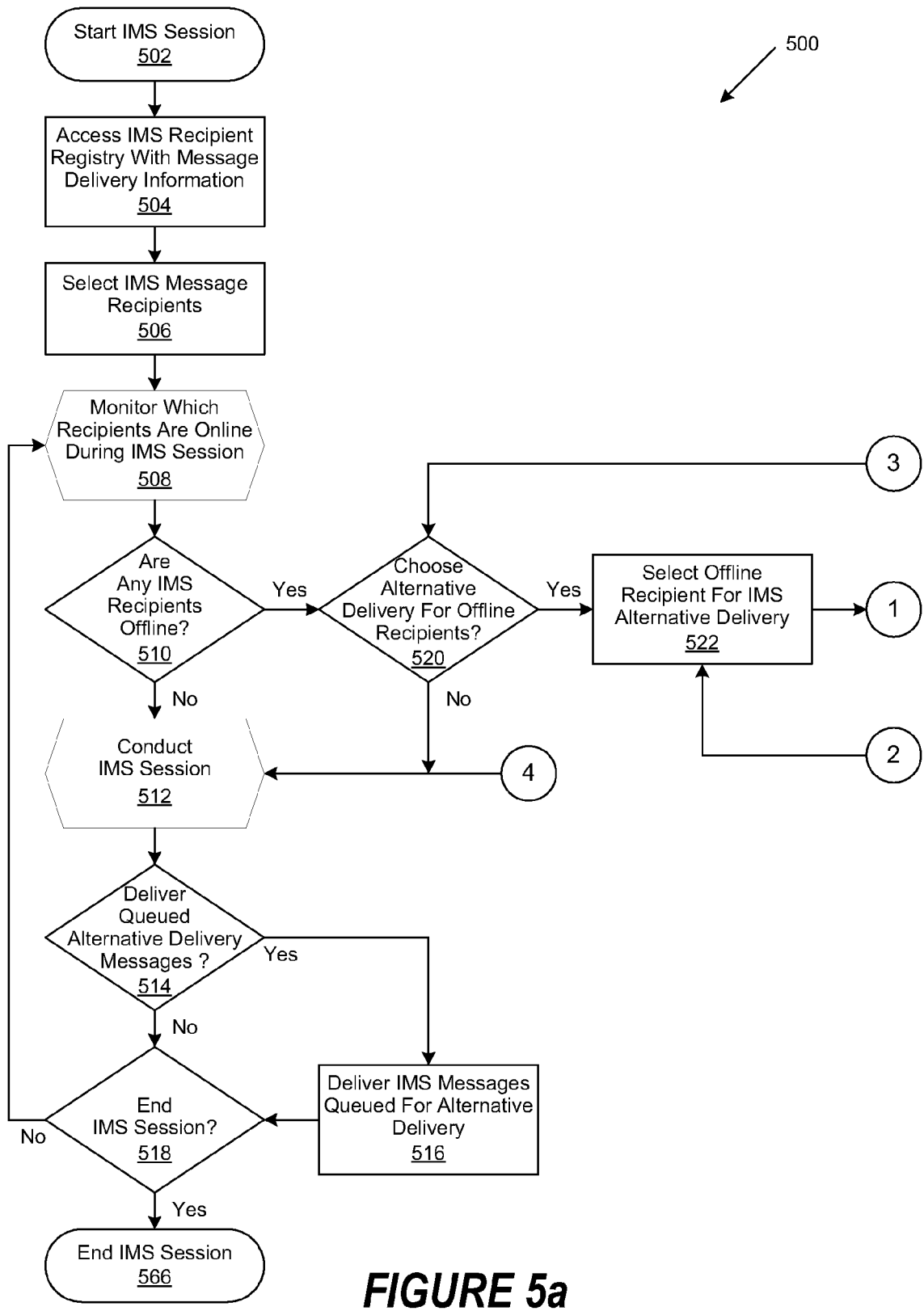
FIGS. 5a-c are a generalized flowchart of an instant messaging system 500 as implemented in accordance with an embodiment of the invention.
Figure 5B:
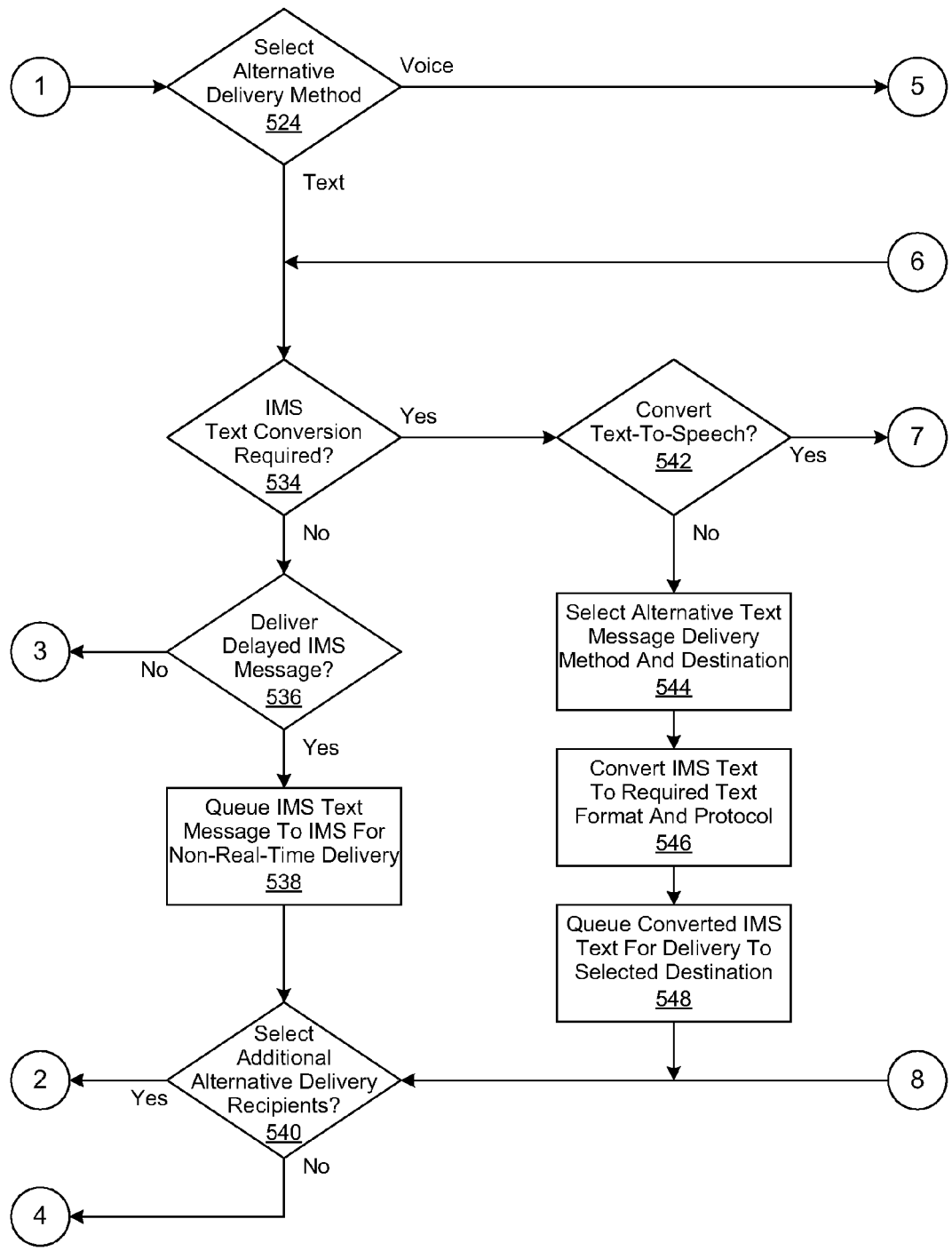
Figure 5C:
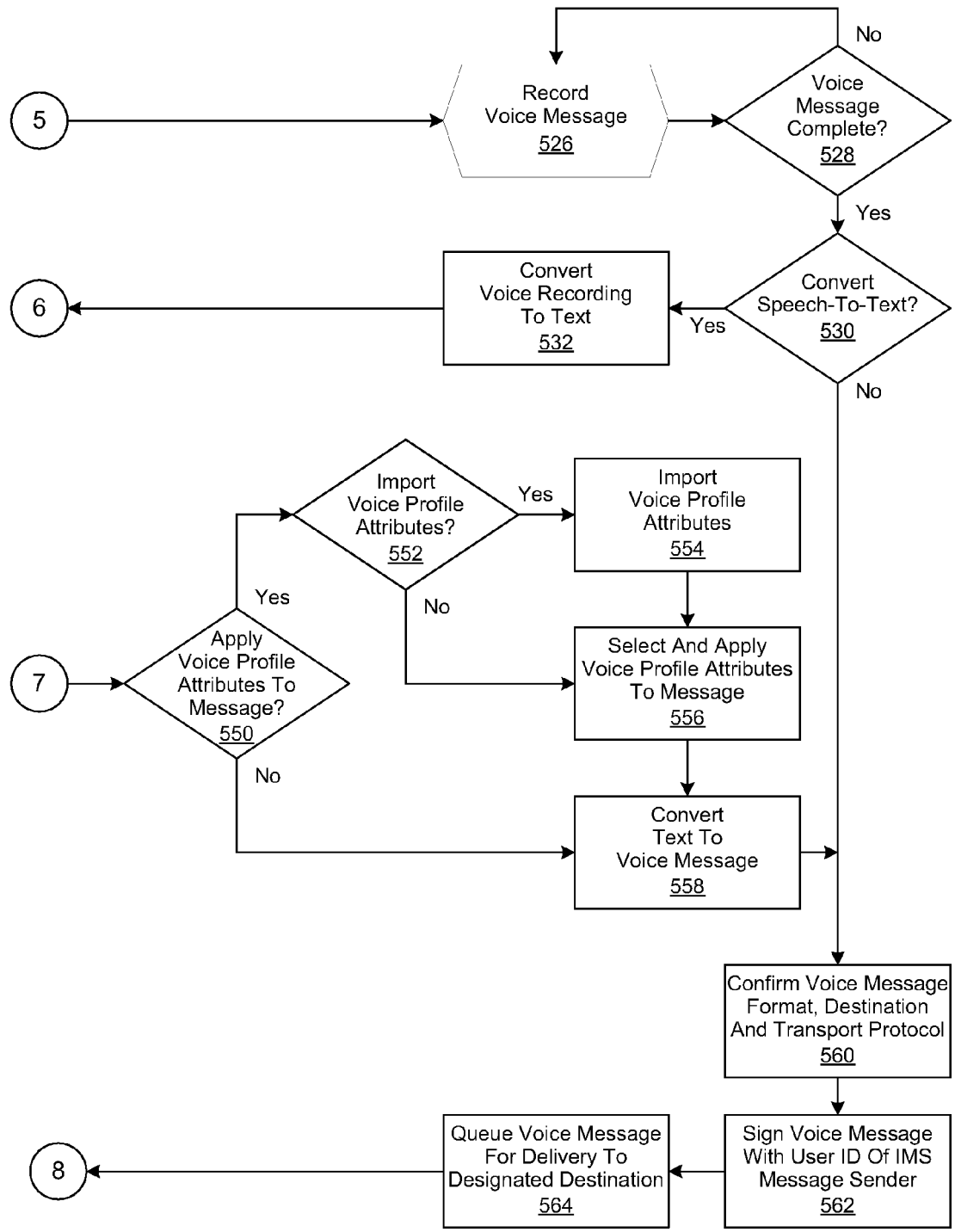

FIGS. 5*a*-*c* are a generalized flow chart of an instant messaging system 500 as implemented in accordance with an embodiment of the invention. In various embodiments, an instant messaging system (IMS) session is begun in step 502 with an IMS message sender accessing an IMS recipient registry in step 504. In one embodiment, the IMS recipient registry indicates which IMS message recipients are currently on-line and also comprises message delivery information for non-real-time delivery of IMS messages to off-line IMS message recipients. In one embodiment, the message delivery information comprises voicemail address, format and communication protocol information. In another embodiment, the message delivery information comprises electronic mail (email) address, format and communication protocol information. In step 506, the IMS message sender selects IMS message recipients from the IMS recipient registry and ongoing IMS monitoring is begun in step 508 to determine if any of the selected IMS message recipients are off-line.

If it is determined in step 510 that none of the selected IMS message recipients are off-line, then IMS session operations are conducted in step 512. A determination is made in step 514 whether there are any queued IMS messages requiring alternative or non-real-time delivery to one or more electronic messaging systems. If there are, then they are delivered in step 516. Otherwise, or after the queued IMS messages are delivered alternatively or in non-real-time, a determination is made in step 518 whether to end the IMS session. If it is decided to not end the IMS session, then the process is repeated, beginning with step 508. Otherwise, the IMS session is ended in step 566.

However, if it is determined in step 510 that one or more of the selected IMS messaged recipients are off-line, then a decision is made in step 520 whether to implement an alternative or non-real-time IMS message delivery method. If it is decided in step 520 to not to choose an alternative or non-real-time IMS message delivery method, then IMS session operations are conducted in step 512. A determination is made in step 514 whether there are any queued IMS messages requiring alternative or non-real-time delivery to one or more electronic messaging systems. If there are, then they are delivered in step 516. Otherwise, or after the queued IMS messages are delivered alternatively or in non-real-time, a determination is made in step 518 whether to end the IMS session. If it is decided to not end the IMS session, then the process is repeated, beginning with step 508. Otherwise, the IMS session is ended in step 566.

If it is decided in step 520 to implement an alternative or non-real-time IMS message delivery method for off-line IMS message recipients, then a first off-line IMS message recipient is selected in step 522. Once selected, the alternative IMS message delivery method for the selected IMS message recipient is determined in step 524. If it is determined that a voice message will be generated for non-real-time delivery, then the IMS message sender records a voice message in step 526. In one embodiment, the IMS message sender records a voice message by speaking into a microphone coupled to the IMS client application running on their computer. In this embodiment, the IMS message sender records, pauses, replays, edits, cancels and performs other voice message operations through user gestures with the user interface of the IMS client application. Through implementation of these voice message operations, the IMS sender can review an audio version of the voice message prior to its non-real-time delivery to the selected IMS message recipient. If it is determined in step 528 that the voice message is not yet complete, then voice message operations continue, beginning with step 526.

Once voice message operations are completed, it is then determined in step 530 whether to convert the recorded voice message into text. If it is decided in step 530 to convert the recorded voice message into text, then speech-to-text conversion operations familiar to those of skill in the art are performed in step 532. In one embodiment, the converted text is displayed within a window of the IMS client application. Once displayed, the IMS message sender can review the converted text of the voice message prior to its non-real-time delivery to the selected IMS message recipient.

After speech-to-text conversions are performed in step 532, or if it is determined in step 524 to select text as an alternative or non-real-time IMS message delivery method, then it is determined in step 534 whether to IMS text conversion is required. If it is determined in step 534 that IMS text conversion is not required, then a determination is made in step 536 whether the IMS text will be delivered in non-real-time as an IMS text message to the IMS message recipient. If it is determined in step 536 to not deliver the IMS text in non-real-time, then the process is repeated beginning with step 520, where a determination is made whether an alternative or non-real-time delivery method is chosen for an off-line IMS message recipient. Otherwise, the IMS text is queued for non-real-time IMS system delivery to the IMS message recipient in step 538. It is then determined in step 540 whether additional IMS message recipients will be selected for alternative or non-real-time delivery of IMS messages. If it is determined in step 540 to select additional IMS message recipients, then the process is continued beginning with step 522, with the selection of an additional recipient for alternative IMS message delivery. Otherwise, the process is repeated beginning with step 512, where IMS session operations are conducted as described in greater detail herein.

However, if it is determined in step 534 that IMS text conversion is required, then it is determined in step 542 whether to convert the text of the IMS message into a voice message. If it is determined in step 542 that the text of the IMS message is not to be converted into a voice message, then an alternative text message delivery method and destination are selected in step 544. Once selected, conversion operations are performed on the IMS message text to convert it into the required format and communication protocol in step 546. In one embodiment, the IMS text message is converted into an email message that is deliverable in non-real-time to an email address for retrieval by the IMS message recipient. Once conversion operations are completed in step 548, the converted IMS text message is queued for non-real-time delivery in step 548. It is then determined in step 540 whether additional IMS message recipients will be selected for alternative or non-real-time delivery of IMS messages. If it is determined in step 540 to select additional IMS message recipients, then the process is continued beginning with step 522, with the selection of an additional recipient for alternative IMS message delivery. Otherwise, the process is repeated beginning with step 512, where IMS session operations are conducted as described in greater detail herein.

However, if it is determined in step 542 that the IMS message text is to be converted into a voice message, then a determination is made in step 550 whether voice profile attributes are to be applied to the IMS message text during text-to-speech conversion operations. If it is determined in step 550 that voice profile attributes are to be applied, then a determination is made in step 552 whether voice profile attributes are to be imported. If voice profile attributes are to be imported, they are imported in step 554 and made available for use by the IMS system. Otherwise, the IMS message sender selects and applies the voice profile attributes to the IMS message text in step 556. In one embodiment, the IMS message sender selects gender (e.g., male, female), their age (child, teen, adult, etc.), and style (question, happy, sad, etc.) attributes which can be applied to the IMS text during its conversion to a voice message. In another embodiment, personality voices (e.g., cartoon characters, movie stars, etc.) can be likewise applied to the IMS text. The application of these voice profile attributes allows the IMS message sender to create a synthesized voice message tone and style for the voice message that will be delivered in non-real-time to the IMS message recipient. Many such voice profile attribute combinations are possible and the foregoing examples are neither exhaustive nor intended to constrain the possible combinations that are implementable in different embodiments of the invention.

Once voice profile attributes have been selected and applied in step 556, or if it is determined in step 550 to not apply voice profile attributes, then text-to-speech operations familiar to those of skill in the art are performed in step 558. In one embodiment, the IMS message sender composes a text message within the IMS client application for conversion into a synthesized voice message that will be delivered to the IMS message recipient's voicemail system in non-real-time. In this embodiment, the IMS message recipient is either off-line, real-time delivery of the message is not necessary, or the IMS message sender may prefer that the IMS text message be delivered as a voice message. Accordingly, the IMS message sender composes, reviews, and edits the text message within a window of the IMS client application. Once the IMS message sender completes composition of the IMS text message, text-to-speech conversion operations familiar to those of skill in the art are performed. The resulting converted IMS text message is delivered as a voice message to a predetermined voice mail box for retrieval by the IMS message recipient.

After text-to-speech conversions are performed in step 558, or if it is determined in step 530 that speech-to-text conversion operations are not required, then the IMS message sender confirms the voice mail format, destination and transport protocol in step 560. In one embodiment, the voice message is formatted into a predetermined audio format such as waveform audio format (.wav), audio file format (.au), or audio interchange file format (.aiff). In another embodiment, the predetermined audio output format comprises the voice over Internet protocol (VoIP) format. Many such combinations are possible and the foregoing examples are neither exhaustive nor intended to constrain the possible combinations of audio formats or communication protocols that are implementable in different embodiments of the invention. After voice message format, destination and transport protocol is confirmed in step 560, the voice message is signed with the user ID of the IMS message sender in step 562. The voice message is then queued for non-real-time delivery to its destination in step 564. If it is determined in step 540 to select additional IMS message recipients, then the process is continued beginning with step 522 with the selection of an additional recipient for alternative IMS message delivery. Otherwise, the process is repeated beginning with step 512, where IMS session operations are conducted as described in greater detail herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implemented method for delivering an instant message, comprising:
    storing instant message recipient data in a recipient registry, wherein said instant message recipient data comprises:
        a preferred electronic message delivery format associated with an instant message recipient, wherein said preferred electronic message delivery format for use when said instant message recipient is unable to receive said instant message; and
        storage location data associated with an electronic messaging system storage location associated with said preferred electronic message delivery format;
    receiving instant message-data from an instant message originator, wherein said instant message data is processed to generate an instant message for receipt by said instant message recipient;
    determining whether said instant message recipient is able to receive said instant message;
    processing said instant message recipient data to determine said message recipient's preferred message delivery format upon determination that said instant message recipient is unable to receive said instant message; and
    processing said instant message to convert said instant message into said preferred message delivery format, wherein said instant message is stored in said preferred message delivery format in said associated electronic messaging system storage location.

2. The method of claim 1, wherein said instant message is subsequently retrieved in said preferred message delivery format from said preferred electronic messaging system storage location by said instant message recipient.

3. The method of claim 1, wherein said preferred electronic message delivery format comprises electronic mail data.

4. The method of claim 3, wherein text data in said instant message is edited by said instant message originator prior to being converted into said preferred electronic message delivery format.

5. The method of claim 1, wherein said preferred message delivery format comprises voicemail data.

6. The method of claim 5, wherein said preferred message delivery format comprises voicemail data.

7. A system for delivering an electronic message using a first computer connected to a communication network, said first computer comprising:
    a processor;
    a data bus coupled to the processor; and
    a non-transitory computer-usable storage medium embodying computer program code, the non-transitory computer-usable storage medium being coupled to the data bus, the computer program code for delivering an instant message and comprising instructions executable by the processor and configured for:
    storing instant message recipient data in a recipient registry, wherein said instant message recipient data comprises:
    a preferred electronic message delivery_format associated with an instant message recipient, wherein said preferred electronic message delivery format for use when said instant message recipient is unable to receive said instant message; and
    storage location data associated with an electronic messaging system storage location associated with said preferred electronic message delivery format;
    receiving instant message-data from an instant message originator, wherein said instant message data is processed to generate an instant message for receipt by said instant message recipient;
    determining whether said instant message recipient is able to receive said instant message;
    processing said instant message recipient data to determine said message recipient's preferred message delivery format upon determination that said instant message recipient is unable to receive said instant message; and processing said instant message to convert said instant message into said preferred message delivery format, wherein said instant message is stored in said preferred message delivery format in said associated electronic messaging system storage location.

8. The system of claim 7, wherein said instant message is subsequently retrieved in said preferred message delivery format from said preferred electronic messaging system storage location by said instant message recipient.

9. The system of claim 1, wherein said preferred electronic message delivery format comprises electronic mail data.

10. The system of claim 9, wherein text data in said instant message is edited by said instant message originator prior to being converted into said preferred electronic message delivery format.

11. The system of claim 1, wherein said preferred message delivery format comprises voicemail data.

12. The system of claim 11, wherein said preferred message delivery format comprises voicemail data.

13. A non-transitory computer-readable storage medium embodying computer program code for use by a first computer coupled to a communication system, the computer program code comprising computer executable instructions configured for:
- storing instant message recipient data in a recipient registry, wherein said instant message recipient data comprises:
  - a preferred electronic message delivery format associated with an instant message recipient, wherein said preferred electronic message delivery format for use when said instant message recipient is unable to receive said instant message; and
  - storage location data associated with an electronic messaging system storage location associated with said preferred electronic message delivery format;
- receiving instant message-data from an instant message originator, wherein said instant message data is processed to generate an instant message for receipt by said instant message recipient;
- determining whether said instant message recipient is able to receive said instant message;
- processing said instant message recipient data to determine said message recipient's preferred message delivery format upon determination that said instant message recipient is unable to receive said instant message; and
- processing said instant message to convert said instant message into said preferred message delivery format, wherein said instant message is stored in said preferred message delivery format in said associated electronic messaging system storage location.

14. The non-transitory computer-usable medium of claim 13, wherein said instant message is subsequently retrieved in said preferred message delivery format from said preferred electronic messaging system storage location by said instant message recipient.

15. The non-transitory computer-usable medium of claim 13, wherein said preferred electronic message delivery format comprises electronic mail data.

16. The non-transitory computer-usable medium of claim 15, wherein text data in said instant message is edited by said instant message originator prior to being converted into said preferred electronic message delivery format.

17. The non-transitory computer-usable medium of claim 13, wherein said preferred message delivery format comprises voicemail data.

18. The non-transitory computer-usable medium of claim 17, wherein said preferred message delivery format comprises voicemail data.

19. The non-transitory computer usable medium of claim 13, wherein the computer executable instructions are deployable to a client computer from a server at a remote location.

20. The non-transitory computer usable medium of claim 13, wherein the computer executable instructions are provided by a service provider to a customer on an on-demand basis.

\* \* \* \* \*